United States Patent
Alberth, Jr. et al.

(10) Patent No.: US 8,977,275 B2
(45) Date of Patent: *Mar. 10, 2015

(54) IN-VEHICLE PICO-CELL SYSTEM AND METHODS THEREFOR

(75) Inventors: William P. Alberth, Jr., Prairie Grove, IL (US); Daniel J. Declerck, Lake Barrington, IL (US); David J. Krause, Kenosha, WI (US); William E. Welnick, Poway, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 1470 days.

This patent is subject to a terminal disclaimer.

(21) Appl. No.: 11/306,514

(22) Filed: Dec. 30, 2005

(65) Prior Publication Data

US 2007/0155421 A1 Jul. 5, 2007

(51) Int. Cl.
*H04W 40/00* (2009.01)
*H04W 48/18* (2009.01)
*H04B 7/185* (2006.01)
(Continued)

(52) U.S. Cl.
CPC ........... *H04W 48/18* (2013.01); *H04B 7/18508* (2013.01); *H04W 84/005* (2013.01); *H04W 88/06* (2013.01)
USPC ........................................ 455/449; 455/569.2

(58) Field of Classification Search
CPC ..... H04W 88/06; H04W 36/32; H04W 48/16; H04W 36/08; H04W 48/18; H04W 48/20; H04W 4/02; H04W 84/045; H04W 36/36; H04W 72/12; H04W 76/025; H04W 8/02; H04W 92/20; H04W 24/02; H04W 36/00
USPC .................. 455/569.2, 449, 73, 422.1, 426.1; 370/328, 338
See application file for complete search history.

(56) References Cited

U.S. PATENT DOCUMENTS 5,594,782 A * 1/1997 Zicker et al. .................. 455/417
5,995,833 A 11/1999 Zicker
6,223,032 B1 4/2001 Cuffaro
(Continued)

FOREIGN PATENT DOCUMENTS

WO 02060204 A1 8/2002

OTHER PUBLICATIONS

International Search Report from U.S. Patent Office; for International Application No. PCT/US06/61981; dated Oct. 24, 2007.
(Continued)

*Primary Examiner* — Nay A Maung
*Assistant Examiner* — Angelica M Perez
(74) *Attorney, Agent, or Firm* — Morris & Kamlay LLP (57) ABSTRACT

An apparatus (100) generates a preferred roaming list (108) for a wireless mobile station (404) that includes area identification data (such as GEO GROUP_ID) (200) corresponding to an area serviced by at least one wireless wide area network, such as a ground based CDMA system and an area services by at least one in-vehicle wireless pico-cell (402), such as a wireless CDMA pico-cell located on an aircraft or any other suitable vehicle. The area identification data (200) is associated with a wireless in-vehicle pico-cell system identification data (205) and in the case of a CDMA pico cell system, a system identification data SID) and network identification (NID) data pair (206) associated with the in-vehicle wireless pico-cell (402).

13 Claims, 8 Drawing Sheets

(51) Int. Cl.
*H04W 84/00* (2009.01)
*H04W 88/06* (2009.01)

(56) References Cited

U.S. PATENT DOCUMENTS

| | | |
|---|---|---|
| 6,529,491 B1 | 3/2003 | Chang et al. |
| 6,842,460 B1 | 1/2005 | Olkkonen et al. |
| 7,113,780 B2 | 9/2006 | McKenna et al. |
| 7,343,157 B1 | 3/2008 | Mitchell |
| 7,426,382 B2 * | 9/2008 | Aerrabotu et al. ............ 455/411 |
| 7,593,365 B1 | 9/2009 | Delker et al. |
| 2002/0077144 A1 | 6/2002 | Keller et al. |
| 2002/0198977 A1 | 12/2002 | Cho |
| 2003/0035464 A1 | 2/2003 | Dehner et al. |
| 2004/0203562 A1 | 10/2004 | Kolsrud |
| 2005/0042999 A1 * | 2/2005 | Rappaport .................... 455/307 |
| 2005/0079880 A1 | 4/2005 | Donner |
| 2005/0282544 A1 | 12/2005 | Oommen |
| 2006/0030311 A1 | 2/2006 | Cruz |
| 2006/0286977 A1 * | 12/2006 | Khandelwal et al. ...... 455/432.1 |
| 2007/0155381 A1 | 7/2007 | Alberth |
| 2007/0155421 A1 | 7/2007 | Alberth |
| 2007/0232307 A1 * | 10/2007 | Ibrahim et al. ................ 455/436 |

OTHER PUBLICATIONS

Uchida, Nobuyuki; GSM/UMTS PRL Overview V2; QUALCOMM Incorporated; Sep. 5, 2003; pp. 1-15.
Guckian, Paul; Hearing on Cell Phones on Aircraft: Nuisance or Necessity?; U.S. House of Representatives Subcommittee on Aviation; Jul. 14, 2005; pp. 1-7.
American Airlines; Demonstration Figure; 1 page.
International Search Report from U.S. Patent Office; for International Application No. PCT/US06/61981; dated Oct. 24, 2007; 7 pages.
International Search Report from U.S. Patent Office; for International Application No. PCT/US06/61980; dated Dec. 17, 2007; 11 pages.
Office Action dated Mar. 6, 2009 for U.S. Appl. No. 11/306,513; 42 pages.

* cited by examiner

IN-VEHICLE PICO-CELL SYSTEM AND METHODS THEREFOR

RELATED CO-PENDING APPLICATION

This application is related to co-pending application entitled "IN-VEHICLE PICOCELL SYSTEM AND METHODS THEREFOR", filed on even date, Ser. No. 11/316,513, having common inventors Alberth et al. and owned by instant Assignee.

FIELD OF THE INVENTION

The invention relates generally to pico-cell based communication systems such as digital wireless local area network systems, and more particularly to in-vehicle wireless based pico-cell communication systems.

BACKGROUND OF THE INVENTION

Proposals have been made to provide a wireless communication system for passengers in a vehicle such as for aviation use to allow cell phones to be used on an aircraft when in flight. For in-vehicle wireless pico-cells such as those proposed for use on aircraft or in any other suitable moving vehicle (e.g. train, bus, etc.), security concerns are of utmost importance.

An in-vehicle wireless CDMA pico-cell has been proposed for use in an aircraft where, for example, a passenger may activate a personal cell phone that includes not only a wireless wide area network transceiver to communicate for example with ground based networks, but also where the transceiver can operate as a short range wireless local area network transceiver that may communicate for example with an on aircraft CDMA pico-cell. The in-vehicle wireless CDMA pico-cell performs many of the functions of cell towers that are used in CDMA systems on the ground and may also relay calls to an aircraft satellite communication antenna mounted in the aircraft to communicate wireless calls from the CDMA pico-cell to the ground cellular network. A signal is transmitted from the plane's satellite antenna to an orbiting satellite and global positioning technology in the satellite may be used to track the location of the user or telephone signal as the aircraft moves. Any other suitable off-vehicle air-to-ground link techniques may also be utilized.

The in-vehicle CDMA pico-cell uses standard cellular based station transceiver technology and a low power transmitter since it is designed to provide cellular coverage to a small area for a relatively high number of users. A base station controller (BSC) and antenna subsystem is provided as part of the in-vehicle wireless CDMA pico-cell. The in-vehicle wireless CDMA pico-cell may provide for example both voice and data communications to allow text messaging, internet access, email and other voice and non-voice services. However, use of wireless mobile stations in an aircraft or other vehicle can cause safety concerns. For aircraft, government regulations require that cell phone transmissions stop when the aircraft ascends or descends. Details as to how to enable system selection, safety requirements and other aspects relating to an in-vehicle CDMA pico-cell have not been addressed.

In addition, preferred roaming lists (PRL) are known which are stored in wireless mobile stations, such as cell phones or any other suitable devices and may be originated for example by a system operator through a server and may be provided in the mobile station when it is initially purchased or may be downloaded over the air when a mobile station is initially registered to one or more systems, or at any other suitable time. A preferred roaming list (PRL) is an indexed list of systems stored in a wireless mobile station that defines, for example, systems that the mobile station can access and those systems that are not accessible to a user. As used herein a PRL is not limited to a preferred roaming list in a CDMA system but also refers to any preferred list that provides a wireless mobile device with one or more systems to communicate with. For example, each CDMA ground system is uniquely identified by the combination of a system identification code (SID) and a network identification code (NID) pair and each CDMA base station broadcasts its SID and NID in system overhead messages. Other systems can provide suitable identification information so that when a mobile station moves from one cell to another or one geographic area to another the mobile station can determine which system it is permitted to use and which channels it is allowed to access.

A PRL may include two tables referred to as an acquisition table and a system table. An acquisition table typically contains an indexed list of radio frequency channels for the mobile station to search and each entry may describe the radio frequency environment of a particular area. A system table may contain an indexed list of systems, referenced by SID and NID pairs. Each entry refers to a specific radio frequency environment and each system belongs to a geographical group which is identified by, for example, geographical area identification data. In addition, relative priority among the different systems is specified within a geographical group and roaming display behavior can be specified indicating which system may be a preferred roaming system and those systems that are not allowed to be used by a particular user. Hence preferences can exist within geographic areas and an operator can specify preferences as to which networks a mobile station can access.

Among other advantages, a PRL speeds up channel acquisition and provides the flexibility to specify a "roam" or "not roam" condition indicator on a mobile station's display. For example, operators can specify a mobile station's search behavior in a home market or roaming markets. PRLs have been extended for multimode mobile stations that support for example CDMA, GSM systems or UMTS systems. By way of example, with a multimode enabled wireless mobile station, at power up, the wireless mobile station may try to acquire the priority CDMA system which may be for example indexed as "0" in an acquisition table (highest priority). If the wireless mobile station successfully acquires that system or any CDMA system, the wireless mobile station may choose that CDMA system and provide service. If the mobile is unable to acquire a CDMA system in the PRL, the mobile may try to acquire a different type of system such as a GSM system which may be indexed as "1" in an acquisition table (lower priority). These indexes of different systems may be indexed for the geographical area identification data (e.g. geographic groups of systems). For example these multiple systems may cover a common geographic area defined by a system operator such as the City of Los Angeles since multiple different systems may be setup to cover Los Angeles. Because the CDMA service is indicated as most preferred in this particular geographic area, even though GSM service is acquired, the wireless mobile station may perform periodic reselection of CDMA services since it is the most preferred system in the acquisition table. However, suitable acquisitions schemes for mobile stations that can communicate on WWAN and in-vehicle CDMA wireless pico-cells are also needed.

Accordingly, a need exists for an apparatus and methods that suitably support an in-vehicle CDMA pico-cell system.

BRIEF DESCRIPTION OF THE DRAWINGS

The invention will be more readily understood in view of the following description when accompanied by the below figures and wherein like reference numerals represent like elements.

DETAILED DESCRIPTION OF THE PRESENT EMBODIMENTS

Briefly, an apparatus, such as a wireless network element, base site controller or any other suitable apparatus, generates a preferred roaming list for a wireless mobile station that includes geographical group identifiers referred to as area identification data (GEO GROUP_ID) corresponding to an area serviced by at least one wireless wide area network, such as a terrestrial based CDMA system and an area services by at least one in-vehicle wireless pico-cell, such but not limited to as a wireless CDMA pico-cell located on an aircraft or any other suitable vehicle. The area identification data (GEO GROUP_ID) is associated with wireless in-vehicle pico-cell system identification data that identifies a particular in-vehicle pico cell system, and in the case of a CDMA pico cell system, the wireless in-vehicle pico-cell system identification data is a system identification data (SID) and network identification (NID) data pair that identifies the in-vehicle wireless CDMA pico-cell.

In one example, a system operator is presented with a user interface that allows the system operator to selectively choose area identification data (e.g., GEO GROUP_ID) that the links corresponding in-vehicle wireless pico-cell system identification data, such as a SID and NID data in a CDMA pico cell embodiment, with the GEO GROUP_ID. This corresponds to the in-vehicle area service by the wireless pico-cell which is in one example is an in-aircraft wireless CDMA pico-cell. The PRL contains in one example, multiple group identifiers wherein each group may include an in-vehicle wireless CDMA pico-cell SID and NID pair or other data that represents other types of in-vehicle pico cells. The in-vehicle wireless pico-cells are given priority over wireless wide area networks. Among other advantages rapid acquisition may be provided for wireless mobile stations once a user boards an aircraft and once the in-vehicle wireless pico-cell is activated. Other advantages will be recognized by those of ordinary skill in the art.

In another embodiment, a control apparatus, such as an in-vehicle pico-cell base station or any other suitable apparatus, controls an in-vehicle wireless pico-cell using control logic that registers wireless mobile stations that desire to use the in-vehicle wireless pico-cell and determines if a received pico-cell communication that does not require transcoding in-vehicle (locally by the control apparatus) is for a registered wireless mobile station. If so, the control apparatus routes the received pico-cell communication to another mobile station that is also in-vehicle and registered with the in-vehicle wireless pico-cell.

In another embodiment, once mobile stations are suitably registered and using the in-vehicle wireless pico-cell, control logic is operative to cause a pico-cell neighbor list and channel list to be transmitted to the registered wireless mobile stations wherein the pico-cell neighbor list and channel lists identifies only the in-vehicle wireless pico-cell. Accordingly, the wireless mobile stations do not need to consider other neighboring cells or channel list so that faster acquisition may be provided.

In another example, the control logic is operative to generate a service interruption notification, such as a pico-cell based voice recorded message for those users on a voice call using their mobile stations, or an SMS message for those users on a data call. The service interruption notification indicates that the in-vehicle wireless pico-cell will be unavailable. For example as an aircraft is in its descent, the flight crew may shut down the pico-cell or otherwise provide an indication to the in-vehicle wireless pico-cell that the pico-cell will be shut down in several minutes. In response, the in-vehicle wireless pico-cell transmits a service interruption notification to all current users indicating that the in-vehicle wireless pico-cell will be shutting down in several minutes. As such the service interruption notification may include information as to when the pico-cell service will become unavailable.

In another example once the in-vehicle wireless pico-cell is to be shut down or otherwise stop service to existing registered mobile stations, the control logic causes a pico-cell protect message to be transmitted wherein the protect message instructs the registered mobile stations to no longer transmit using their local pico transmitters and/or their local WWAN transmitters. The pico-cell may also shut down it's transmitter so that it will not interfere with operation of the aircraft. By way of example the pico-cell protect message may cause the wireless mobile station devices to present a displayed message to the user notifying the user that the device can no longer transmit and that the user should power down and power on the device to reset the mobile station to again provide transmitter capability. Other forms of notification may also be provided such as audible beeps or any other suitable notifications.

In one embodiment the wireless mobile stations include control logic that in response to the protect message, automatically perform a restart cycle after a period of time has lapsed.

In another embodiment, the in-vehicle wireless pico-cell is controlled to operate in a beacon mode while passengers are boarding the aircraft. This beacon mode uses first network identification data (NID). Control logic causes the pico-cell protect message to be transmitted so that the mobile stations that are boarding the aircraft receive instructions to shut off their transmit capabilities. Once authorized by the flight crew, control logic in the in-vehicle wireless pico-cell then operates the pico-cell in an in-use mode to use a different NID causing the pico-cell mobile stations to transmit to the pico-cell. This may be done for example after the aircraft is at a suitable altitude and the flight crew has indicated to the pico-cell that it is okay to allow passengers to use their mobile stations in flight. Corresponding methods are also disclosed which may be carried out by any suitable devices.

Techniques are described for setting up a PRL to accommodate in-vehicle wireless pico-cells as well as methods of operating in-vehicle wireless pico-cells, such as CDMA pico cells, TDMA pico cells or other types of pico cells and mobile stations that communicate with the in-vehicle wireless pico-cells. In addition optimized background scan techniques are also disclosed.

Figure 1:
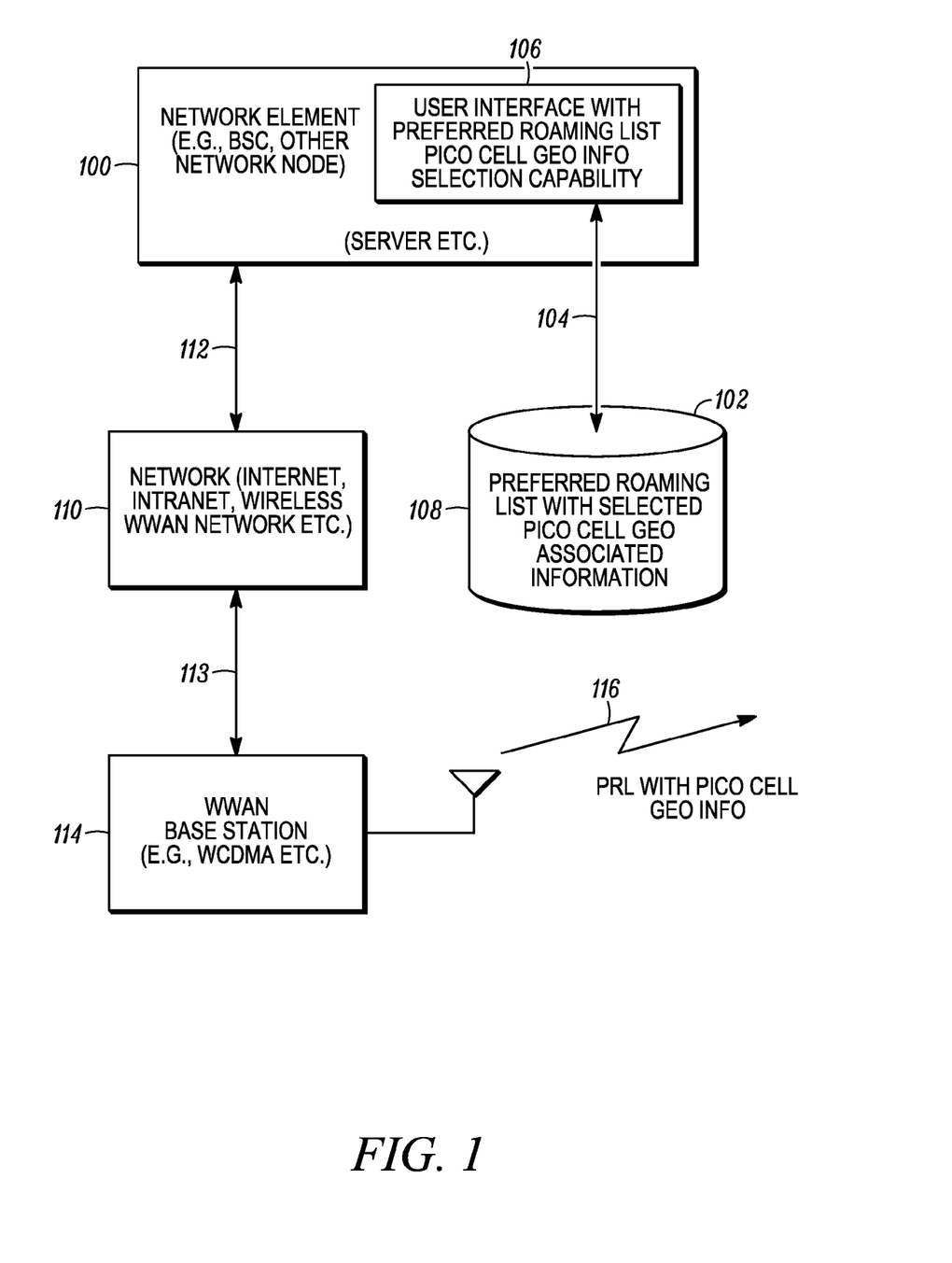
FIG. 1 is one example of a block diagram of an apparatus that generates a preferred roaming list in accordance with one embodiment of the invention.

FIG. 1 illustrates one example of an apparatus 100, such as a base site controller, other cellular communication system network element, or any other suitable network node such as a server accessible by a system operator. The apparatus 100 employs logic, such as one or more suitably programmed processors such as CPUs, micro-controllers, DPSs or any other suitable digital processing devices, to carry out the operations described herein. For example, the apparatus 100 may include memory (e.g. RAM, ROM, etc.) that stores executable instructions that are executed by the programmed processors. However it will be recognized that any suitable form of logic may be used including discrete logic, state machines, or any other suitable combination of hardware, software and firmware. The apparatus 100 is operatively coupled to memory 102 shown here to be a database through a suitable link 104. The memory 102 may be local or distributed memory that may be available through a suitable network connection including internet connections, intranet connections or any other suitable buses or any other links. The apparatus 100 includes a user interface 106 provided by the logic. The user interface 106 provides user selectability of area identification data (GEO GROUP_ID) corresponding to an area serviced by at least one in-vehicle wireless pico-cell. Accordingly, a system operator may create preferred roaming lists for wireless mobile stations via the user interface 106. The apparatus 100 via the logic generates the preferred roaming list based on the information input through the user interface. The apparatus 100 links the area identification data (GEO GROUP_ID) that is associated with both an area serviced by a wireless wide area network, such as a GSM or CDMA wireless network, and an area serviced by at least one in-vehicle wireless pico-cell such as a CDMA pico-cell located on an aircraft or other suitable vehicle with SID/NID pairs and other data. It will be recognized that although the in-vehicle wireless pico cell will be described as a CDMA pico cell in the various examples described herein, that any suitable in-vehicle wireless pico cell technology may be used. In this example, the GEO GROUP_ID is associated with in-vehicle wireless pico cell system identification data such as CDMA pico-cell system identification data (SID) and corresponding network identification data (NID) that is associated with the in-vehicle wireless CDMA pico-cell. The preferred roaming list 108 is stored in memory 102. Accordingly, the apparatus 100 allows a geographic group in a PRL to have data that identifies not only wireless wide area networks but in addition in-vehicle wireless pico-cell system identification data (and corresponding network identification data if desired).

The apparatus 100 may be suitably coupled to a network 110 such as the internet, wireless wide area network, or any other suitable network, via any suitable communication link 112. The wireless wide area network base station 114 is operatively coupled to the network 110 through any suitable communication link 113. In this example, a wireless wide area network base station 114 communicates the stored PRL 108 to a mobile station via an over-the-air PRL transmission 116. However the PRL 108 may be stored in the wireless mobile station when the wireless mobile station is fabricated, or provided by a service provider, or at any other suitable time.

Figure 2:
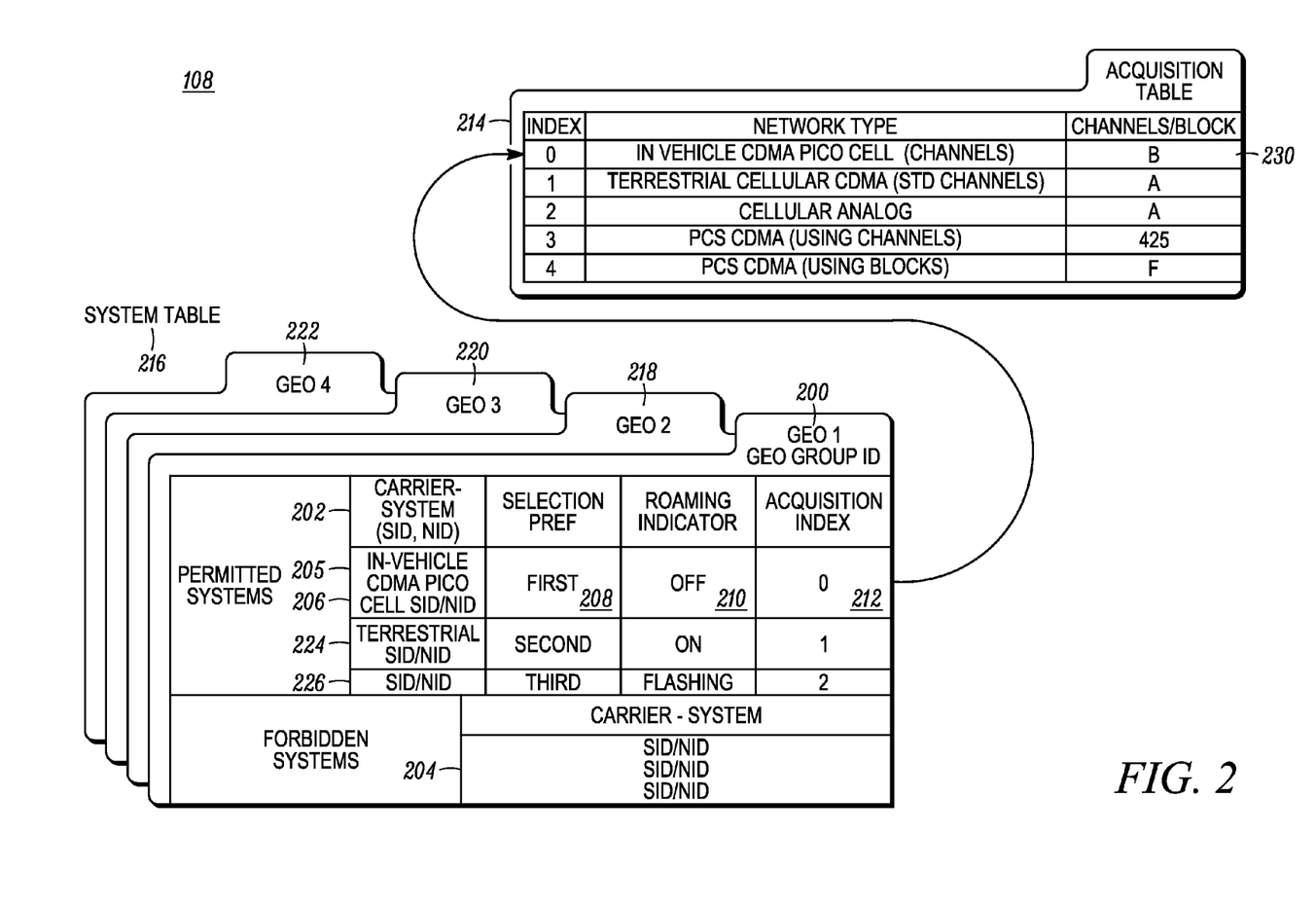
FIG. 2 is a diagram illustrating one example of a preferred roaming list in accordance with the one embodiment of the invention.

Referring also to FIG. 2 which shows one example of a preferred roaming list 108 and the area identification data 200 for a first geographical group linked with (e.g. associated with) system identification data 202 shown in this example as SID and NID pairs for permitted systems for which the mobile station is permitted to communicate, and for forbidden systems identified by SID and NID pairs 204. The area identification data 200 as shown corresponds in this example to an area serviced by three communication networks. In this example an in-vehicle wireless CDMA pico-cell system is identified by in-vehicle wireless pico-cell system identification data 205 shown in this example to be an in-vehicle wireless CDMA pico cell system identification data (SID) and network identification data (NID) pair 206. The in-vehicle wireless CDMA pico-cell SID/NID pair 206 is also linked to priority or selection preference data 208, roaming indicator control data 210 and index data 212 which indexes to an acquisition table 214. The GEO GROUP_ID 200 is part of a system table 216 which includes a plurality of GEO GROUP_IDs 218, 220 and 222 for other geographic groups.

The area identification data 200 in this example is linked to a wireless wide area network shown as a terrestrial wireless wide area network through corresponding SID and NID data pairs 224 and another wireless wide area network is also identified by the GEO GROUP_ID 200 through SID and NID pair 226. Each of these systems also has corresponding selection preference information, roaming indication and indexes to the acquisition table 214. The acquisition index data 212 is linked to the CDMA pico-cell identification data and network identification data pair 216 as priority data that assigns the in-vehicle wireless CDMA pico-cell to be most preferred over the other wireless wide area networks identified by SID and NID pairs 224 and 226. For example the acquisition index "0" is the highest priority acquisition level in the acquisition table 214 and as such the mobile station that stores the PRL 108 will attempt to acquire the channels indicated in the acquisition table 214 associated with index "0" first and then attempt to acquire other channels as defined by the area identification data for a particular geographic group. Accordingly the acquisition table 214 includes CDMA pico-cell channels 230 indexed by the SID and NID pair information 206 through index data 212. Accordingly when a mobile station is turned on such as when a mobile station is allowed to be turned on in an aircraft, the mobile station will first attempt to locate an in-vehicle wireless pico-cell based on the PRL 108.

In an alternative embodiment, the apparatus 100 may be operative to generate a preferred roaming list that includes different area identification data for different groups wherein one group includes wireless wide area networks and a second group corresponding to second area identification data corresponds to an area serviced by an in-vehicle wireless CDMA pico-cell. As such, the groupings may be such that all CDMA pico-cells are in a common geographic group. This would also prevent a mobile device that is camped on a pico-cell from looking for any other systems.

Figure 3:
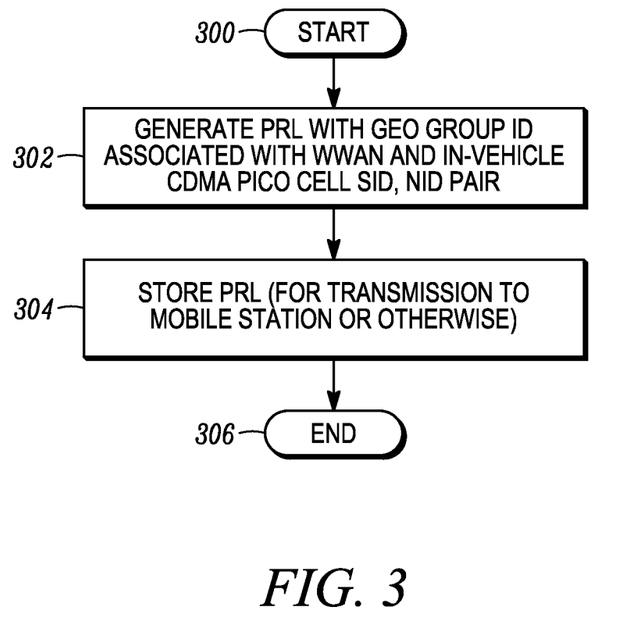
FIG. 3 is one example of a method for providing a preferred roaming list in accordance with one embodiment of the invention.

FIG. 3 illustrates one example of a method that may be carried out for example by the apparatus 100, or any other suitable apparatus. As shown in block 300, the method begins, for example, by providing a system operator with a user interface to create a new type of PRL that is used by a mobile station to acquire specific in-vehicle CDMA pico-cell channels. As shown in block 302, the method includes generating the preferred roaming list that includes area identification data 200 (GEO GROUP_ID) corresponding to at least a geographical area serviced by a wireless wide area network and an area serviced by an in-vehicle wireless CDMA pico-cell. The GEO GROUP_ID 200 is associated with an in-vehicle wireless CDMA pico-cell identification data and network identification data pair 206 that is associated with the in-vehicle wireless CDMA pico-cell. As shown in block 304, the method includes storing the PRL 108 in for example a database or any other suitable memory so that it can be provided to the mobile station in any suitable manner. As shown in block 306, the method may end and the system operator may create another PRL for one or more other mobile stations using the apparatus 100 or any other suitable apparatus. The apparatus 100 suitably links the data shown in FIG. 2 in a way conventional in the art to generate the PRL 108 such but not limited to known database techniques as desired.

The apparatus 100 allows system operators for example to modify preferred roaming list to add in-vehicle wireless CDMA pico-cell SID and NID pairs to one or more geographic groups. In one embodiment, the in-vehicle wireless CDMA pico-cells are made most preferred in each geographic group.

In another embodiment, in-vehicle wireless CDMA pico-cells may be grouped in their own geographic group identified by corresponding geographic area identification data in the event that multiple in-vehicle wireless CDMA pico-cells are available for a particular mobile station to access. In yet another embodiment, the SID and NID pair corresponding to an in-vehicle wireless CDMA pico-cell may be included from a preferred roaming list so that when a mobile wireless station camps on the identified in-vehicle wireless CDMA pico-cell, no additional background searches are performed by a mobile station.

Figure 4:
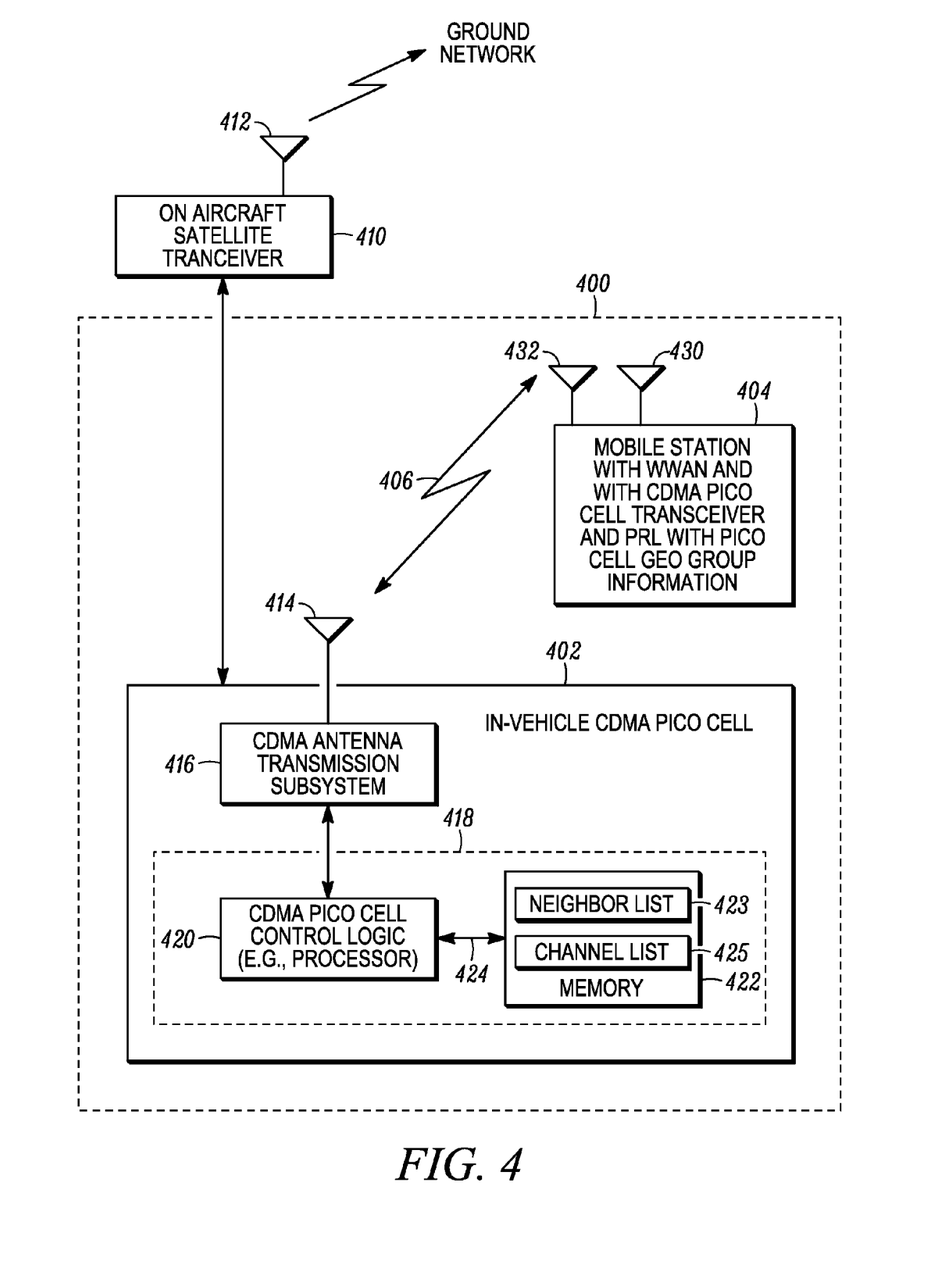
FIG. 4 is a block diagram illustrating one example of a system employing an in-vehicle CDMA pico-cell in accordance with one embodiment of the invention.

FIG. 4 diagrammatically illustrates one example of a CDMA pico-cell communication system 400 that employs an in-vehicle wireless CDMA pico-cell 402 and a wireless mobile station 404 operative to communicate with the in-vehicle CDMA pico-cell 402 using a wireless CDMA link shown as 406. For purposes of illustration only, and not limitation, the CDMA pico-cell communication system 400 will be described as an on-aircraft CDMA pico-cell communication system. Accordingly in this example the in-vehicle wireless CDMA pico-cell 402 is in communication with an on-aircraft satellite transceiver 410 which may include a suitable satellite antenna 412 to communicate with a satellite system to provide air-to-ground communication.

The in-vehicle wireless CDMA pico-cell 402 includes conventional CDMA subsystems and circuits as known in the art and in addition includes control logic to perform the operations described herein. As shown, the in-vehicle wireless CDMA pico-cell 402 includes an antenna 414, an antenna transceiver subsystem 416 and a CDMA base station 418. The CDMA base station includes other components as known in the art and in this example includes control logic 420 such as one or more digital processors executing executable instructions that when executed cause the control logic to operate as described herein. The control logic 420 in this example shown to be one or more processors, is operatively coupled to memory 422, such as RAM, ROM or any other suitable memory, through a suitable communication link 424. The memory 422 may store executable instructions that are executed by the processor to serve as the control logic 420. In addition the memory 422 may also store any other suitable information as required by the in-vehicle wireless CDMA pico-cell, such as neighbor lists 423, channel lists 425 and other information.

The wireless mobile station 404 may be any suitable wireless communication device including but not limited to a handheld cell phone, or any other suitable device and in this example is shown to include a wireless wide area network antenna 430 and a short range CDMA pico-cell antenna 432. However it will be recognized that a single antenna may be used if desired depending upon the systems and application in which the mobile station is used. The wireless mobile station 404 will be described as a handheld cell phone although any other suitable unit can be used. The wireless mobile station 404 stores in local memory (see FIG. 5), the PRL 108 which includes the CDMA pico-cell geographic information linked with the SID and NID pairs as described above.

Figure 5:
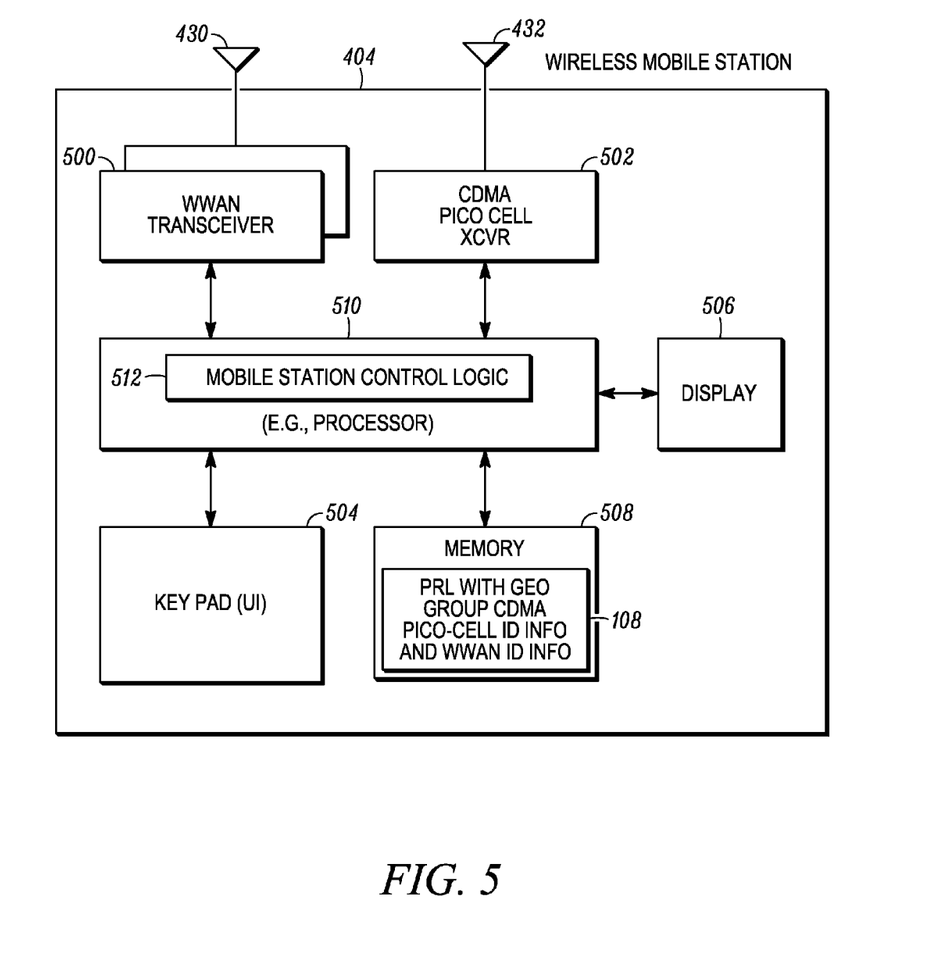
FIG. 5 is a block diagram illustrating one example of the wireless mobile station in accordance with one embodiment of the invention.

FIG. 5 illustrates one example of a wireless mobile station 404 that includes control logic 512 that operates as described herein. In this example, the wireless mobile station 404 includes a wireless wide area network transceiver 500, and a CDMA pico-cell transceiver 502 operatively coupled to respective antennas 430 and 432. The wireless mobile station 404 includes one or more keypads 504, one or more displays 506, memory 508 operatively coupled to one or more processors 510 that are suitably programmed and execute instructions stored in memory 508 to carry out the operations of the control logic 512 described herein. However, as noted above, it will be recognized that the control logic described herein may be implemented using any suitable structure including application specific integrated circuits, discrete logic, state machines, or any suitable combination of hardware, software or firmware. In this particular example, since the control logic 512 is implemented via the processor 510 executing executable instructions, the processor 510 is shown to include the mobile station control logic 512 that carries out the operations described herein. In addition, the memory 508 may be RAM, ROM or any other suitable memory and a portion of memory 508 stores the PRL 108. The mobile station control logic 512 is operative to locate the in-vehicle wireless CDMA pico-cell 402 based on the stored preferred roaming list 108. Communication paths are shown as known in the art, by arrowed lines.

Figure 6:
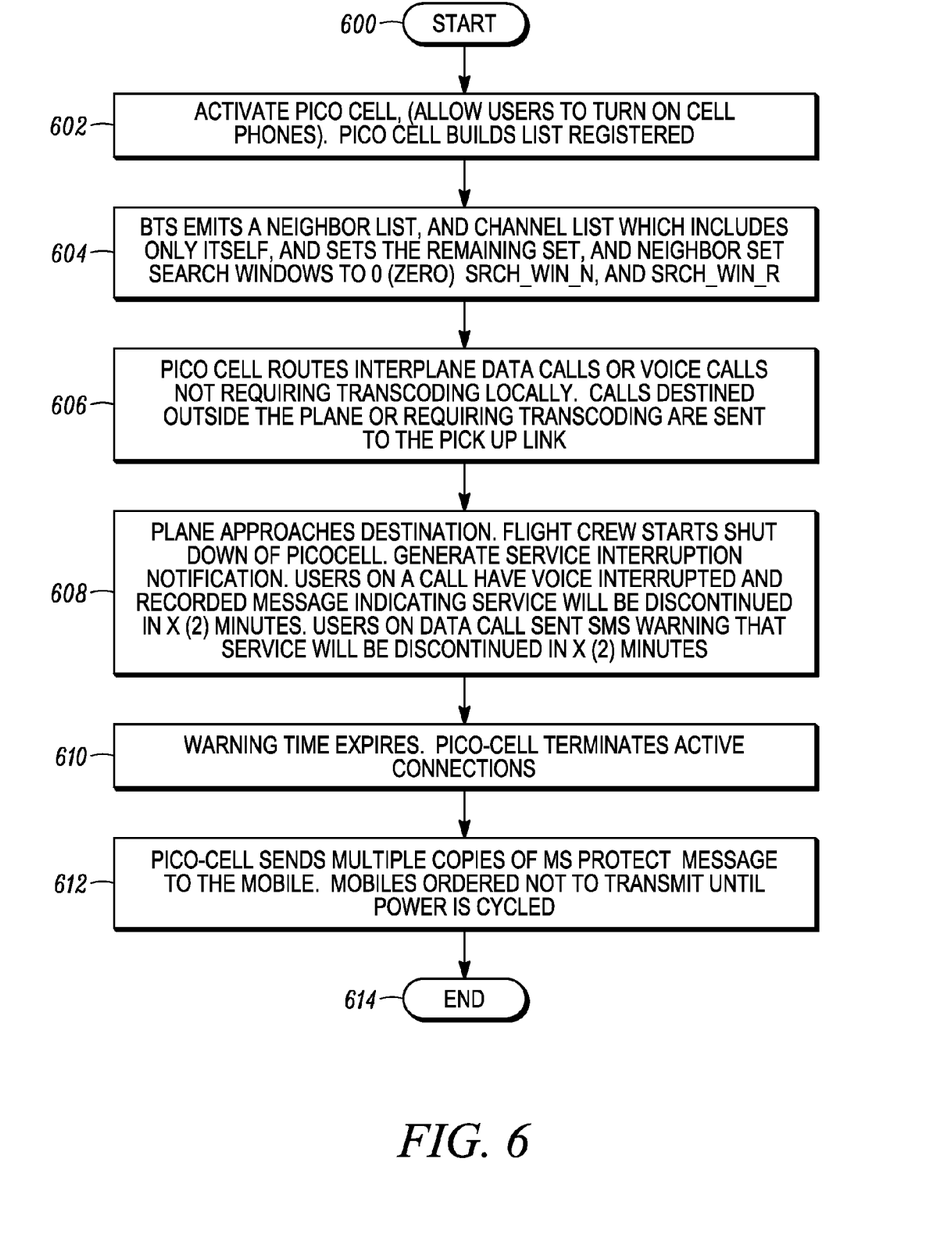
FIG. 6 is a flowchart illustrating one example of a method for providing in-vehicle CDMA pico-cell communication in accordance with one embodiment of the invention.

FIG. 6 illustrates one example of a method used by the CDMA pico-cell communication system 400, or any other suitable system. As shown in block 600, the method includes, for example, an aircraft taking off. As shown in block 602, after reaching an appropriate altitude, for example, the flight crew then activates the in-vehicle wireless CDMA pico-cell by turning it on or otherwise activating the CDMA pico-cell 402 to emit its SID and NID information. In response, the mobile station 404 evaluates its PRL 108 and determines that the SID and NID (206) transmitted by the CDMA pico-cell 402 match. Accordingly, the mobile station registers with the in-vehicle wireless CDMA pico-cell. The in-vehicle wireless CDMA pico-cell 402 then builds a list of registered wireless mobile stations that want to access the in-vehicle wireless CDMA system 400. For example, the flight crew may announce that all users can turn on their mobile stations and after the cell phones are turned on, then the mobile stations scan and attempt to acquire the in-vehicle wireless CDMA pico-cell based on the geo-group ID information and search for the SID/NID transmitted by the in-vehicle CDMA pico-cell. As shown in block 604, the CDMA control logic 420 causes the pico-cell neighbor list 423 and channel list 425 to be transmitted to the wireless mobile station or stations. In one example, the pico-cell neighbor list 423 and channel list 425 identifies only the in-vehicle CDMA pico-cell 402 as being the only neighbor and only its corresponding channels for use by the wireless mobile station. As such, neighbor search windows are set to "0". Other suitable technique may be used so that the wireless mobile station does not continue to search for other cells. As shown in block 606, the CDMA control pico-cell control logic 420 after having registered users in block 602, determines if a received CDMA pico-cell communication from one of the mobile stations does not require transcoding within the vehicle, such as locally by the CDMA pico-cell. If the communication does not require transcoding on the aircraft, the CDMA pico-cell control logic 420 routes the received CDMA pico-cell communication to the appropriate in-aircraft registered wireless mobile station for which it is destined. However, if the CDMA pico-cell communication requires transcoding off-vehicle, the CDMA pico-cell control logic 420 routes the communication to an off-vehicle link such as to the on aircraft satellite transceiver 410 for transcoding in a ground network. As such, off-vehicle bandwidth can be reduced by providing suitable in-vehicle communication routing. Also, calls that are destined outside the aircraft are also sent to the satellite transceiver 410.

As shown in block 608, the method includes generating, such as by the CDMA pico-cell control logic 420, a service interruption notification to registered mobile stations in response to an indication that the CDMA pico-cell will be unavailable. For example, as the plane approaches its destination, the flight crew may start shut down of the CDMA pico-cell. In response to a switch being selected or menu being selected on the CDMA pico-cell, indicating that the CDMA pico-cell is to be unavailable, the in-vehicle CDMA pico-cell generates and transmits a service interruption message. For example, a recorded message is transmitted that is inserted into voice calls being handled by the CDMA pico-cell 402, or SMS messages may be sent to devices that are utilizing data services provided by the CDMA pico-cell. The messages may indicate to a user that the wireless service will be discontinued in a certain amount of time, such as two minutes, five minutes or any other suitable time. As such, the CDMA pico-cell 402 generates the service interruption notification which includes information as to when the CDMA pico-cell service will be unavailable. This can then give users an ample amount of time to complete conversations or otherwise suitably conclude a data session without being unduly interrupted.

As shown in block 610, the method includes terminating, such as by the CDMA pico-cell 402, active connections after the timeout period has lapsed. As shown in block 612, the method includes causing a CDMA pico-cell protect message to be transmitted to registered devices wherein the protect message instructs the wireless mobile stations not to transmit. For example, the mobile stations may be ordered not to transmit until their power is cycled. This may include transmitting a message notifying the mobile station to disable their local transmitters until a suitable time such as after the plane has landed and reaches the gate or any other suitable time. The local CDMA pico-cell transmitter which is part of the CDMA pico-cell transceiver 502 on the mobile station as known in the art, may be disabled (e.g. shut down or otherwise prevented from transmitting information) under the control of the CDMA pico-cell 402. As shown in block 614, the method ends by the CDMA pico-cell 402 shutting off and the flight crew can then announce for all users to turn off their mobile station devices. Alternately, the pico-cell may transmit a message indicating it is safe to transmit. Mobiles receiving the message would scan for and attempt to camp on the regular WWAN in the area, and may specifically avoid camping on the pico-cell.

Figure 7:
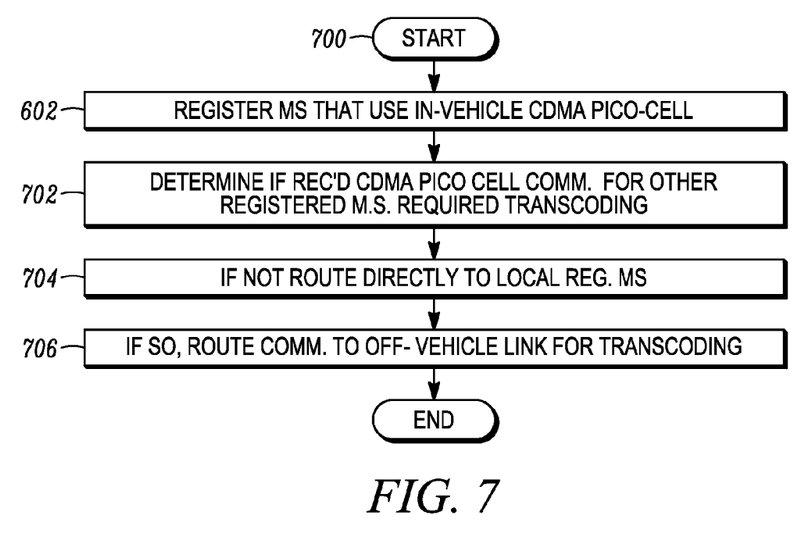
FIG. 7 is a flowchart illustrating one example of a method for providing in-vehicle CDMA pico-cell communication in accordance with one embodiment of the invention.

FIG. 7 illustrates one example of a method carried out by the CDMA pico-cell 402 or any other suitable apparatus. As noted above, the operations described herein may be performed by the CDMA pico-cell control logic 420 or other suitable structure. As shown in block 700, the method includes the CDMA pico-cell transmitting its NID information. As shown in block 602 and as described above, the method includes registering mobile stations that use the in-vehicle CDMA pico-cell. As shown in block 702, the method includes, as described above, determining if a received CDMA message from a mobile station requires transcoding. If not, as shown in block 704, the method includes routing the communication directly to a local registered mobile station. However, if transcoding is required or if the message is for a mobile device that is not registered (e.g. on the ground), the method includes, as shown in block 706, routing the communication to the off-vehicle link for transcoding or other routing.

In another embodiment, the CDMA pico-cell control logic 420 controls the in-vehicle wireless CDMA pico-cell in a beacon mode using network identification data and causes the CDMA pico-cell protect message to be transmitted that instructs the CDMA pico-cell devices (i.e. mobile stations) not to transmit. The control logic 420 may then control the in-vehicle pico-cell in an in-use mode to use a different NID causing the mobile station by way of programming stored in memory 508 to transmit to the CDMA pico-cell. By way of example, passengers may board a plane and the CDMA pico-cell is turned on in a beacon mode. Passengers may be told to turn off their mobile stations and some passengers may do so and others may not. After the plane takes off, the mobiles that are left on will lose service after takeoff. The mobile stations will receive the CDMA pico-cell beacon transmissions and go into the protect mode based on the protect message. Other mobiles that are turned on after takeoff, but before the announcement that it is okay to use phones, will also receive the CDMA pico-cell beacon transmissions and enter into the protect mode. Once the flight crew turns on the in-flight CDMA pico-cell, the pico-cell enters the in-use mode and broadcasts the new NID. The mobile stations recognize the new NID and begin the registration process as previously described. Accordingly, the PRL may include network identification data corresponding to a CDMA pico-cell beacon operation.

Figure 8:
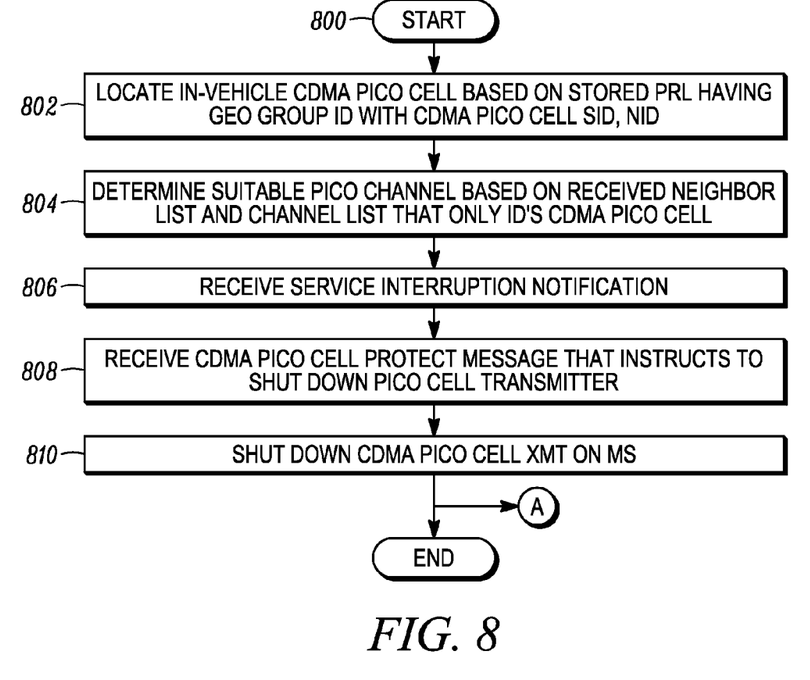
FIG. 8 is a flowchart illustrating one example of a method carried out for example by a mobile station in accordance with one embodiment of the invention.

FIG. 8 illustrates one example of the operation of a wireless mobile station in accordance with one embodiment of the invention, such as wireless mobile station 404. As shown in block 800, the method starts by a user, for example, turning on the wireless mobile station. As shown in block 802, the method includes locating the in-vehicle CDMA pico-cell based on the stored PRL which includes the geo-group ID that has the associated SID and NID information of the CDMA pico-cell. This and other operations are performed by logic 512. As shown in block 804, the method includes determining a suitable pico channel based on the received pico-cell neighbor list 423 and channel list 425 that was communicated by the in-vehicle CDMA pico-cell transmission. As shown in block 806, the method includes receiving a service interruption notification that includes information as to when the CDMA pico service will be unavailable. As shown in block 808, the method includes receiving a CDMA pico-cell protect message that instructs the mobile station not to transmit using its local CDMA pico-cell transmitter or other transmitter. As shown in block 810, the method includes disabling the CDMA pico-cell transmitter on the mobile station. This is done in response to the CDMA pico-cell protect message.

Figure 9:
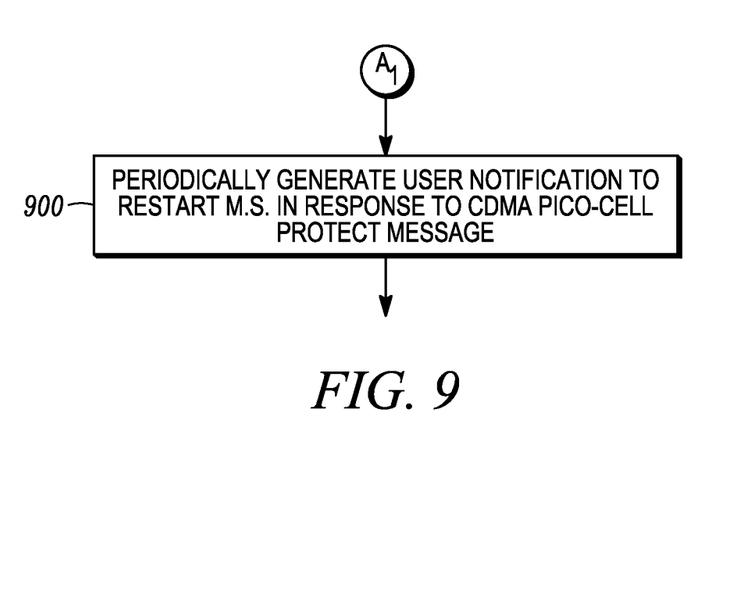
FIG. 9 is a flowchart illustrating one example of an operation carried out by a wireless mobile station in accordance with one embodiment of the invention.
Figure 10:
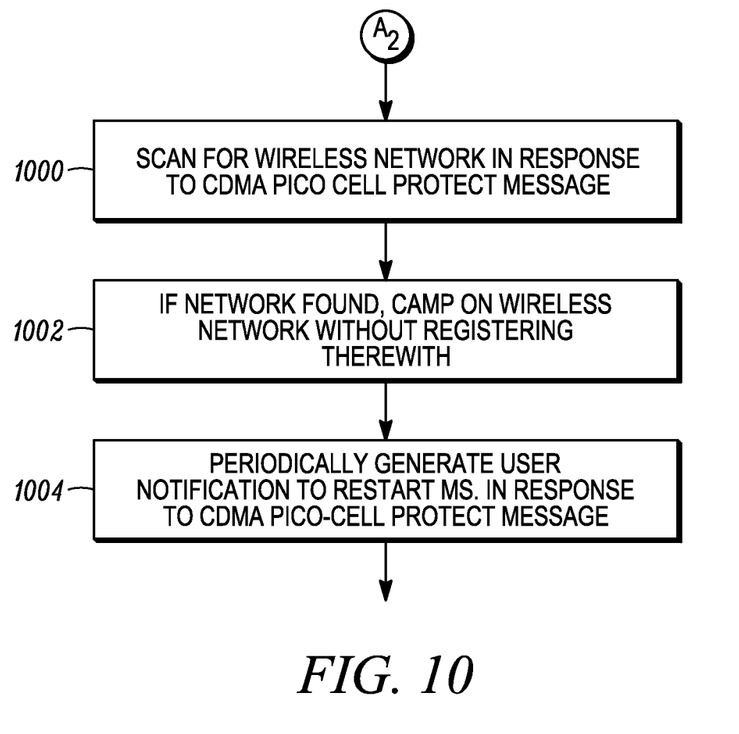
FIG. 10 is a flowchart illustrating a portion of a method for providing communication with an in-vehicle CDMA pico-cell in accordance with one embodiment of the invention.

Referring also to FIGS. 9 and 10, alternate embodiments are shown that allows suitable reactivation of a mobile station once the protect message has been received. As shown in block 900, the method may include periodically generating a user notification, such as a displayed message on the mobile station, for the user to restart the wireless mobile station. This user notification is presented on display 506, or may be an audible output through a suitable speaker or may be provided in any other suitable manner. In addition, the method may include disabling wireless network scanning by the mobile station in response to the CDMA pico-cell protect message to prevent the mobile station from attempting to access a different network and then activating its transmitter at an inappropriate time.

As shown in FIG. 10 the method may include as shown in block 1000, scanning for a wireless network in response to the CDMA pico-cell protect message and as shown in block 1002, if a wireless network is found, camping on the wireless network without registering. As shown in block 1004, the method may include periodically generating a user notification such as on the display of the mobile station, audible output, or any other output, to notify the user to restart the mobile station. This is done in response to the CDMA pico-cell protect message being received. The user notification may be generated until the wireless mobile station is restarted. For example, the different embodiments may allow, for example, the mobile station, via the mobile station control logic 512 to audibly or visually notify the user after a predetermined or set period of time to restart their phone after the protect message has been received. Scanning may be disabled because there is no need to scan since the mobile station is not usable without a transmitter. The mobile device may continue to notify the user at specific intervals of time until the user reactivates the phone.

Accordingly, the mobile station shuts down the wireless wide area network transmitter of the associated transceiver and may also shut down the wireless in-vehicle CDMA pico-cell transmitter of the associated transceiver, as well as any other transmitters in the device. After a specified period of time, the mobile station may turn on the CDMA pico-cell transmitter and search for a CDMA pico-cell channel from a non in-vehicle CDMA pico-cell such as a beacon CDMA pico-cell (or the same pico-cell if it is in the beacon mode) which may occur after the plane has landed and passengers are disembarking. If no non in-vehicle CDMA pico-cell channel is found, the method includes restarting the wireless mobile station such as through a software initiated restart through a command from the control logic 512 after a timeout period has occurred, and then the device begins searching for a wireless wide area network channel.

Among other advantages, an in-vehicle wireless CDMA pico-cell system allows fast acquisition through the use of a unique PRL and security such as in-aircraft security can be implemented via communication of protect message and having mobile devices that suitably respond to the protect messages to ensure compliance with government regulations. Other advantages will be recognized by those of ordinary skill in the art.

It will be obvious to those skilled in the art that techniques taught herein can also be applied to other wireless networks such as but not limited to UMTS, GSM, 802.16, and others.

The above detailed description of the invention and the examples described therein have been presented for the purposes of illustration and description only and not by limitation. It is therefore contemplated the present invention cover any and all modifications, variations, or equivalents that fall in the spirit and scope of the basic underlying principles disclosed above and claimed herein.

What is claimed is:

1. A wireless mobile station, comprising:
a wireless wide area network transceiver and antenna;
a wireless in-vehicle pico cell transceiver and antenna;
control logic operative to control the wireless wide area network transceiver and the wireless in-vehicle pico cell transceiver;
memory, operatively coupled to the control logic, that stores a preferred roaming list that comprises at least first area identification data corresponding to an area serviced by at least one wireless wide area network and an area serviced by at least one in-vehicle wireless pico cell and wherein the first area identification data is associated with an in-vehicle wireless pico cell system identification data associated with the in-vehicle wireless pico cell;
wherein the control logic is further operative to:
automatically locate an in-vehicle wireless pico cell based on the stored preferred roaming list and give priority to the in-vehicle pico cell over the wireless wide area network identified by the first area identification data, based on the stored preferred roaming list; and
determine a suitable pico channel based on a received pico cell neighbor list and channel list that identifies only the in-vehicle pico cell.

2. The wireless mobile station of claim 1, wherein the control logic is operative to:
receive a service interruption notification that includes information as to when the pico cell will be unavailable and produce a user notification; and
receive a pico cell protect message that instructs the wireless mobile station not to transmit.

3. The wireless mobile station of claim 2, wherein the control logic is operative to:
periodically generate a user notification to restart the wireless mobile station in response to the pico cell protect message until the wireless mobile station is restarted.

4. The wireless mobile station of claim 3, wherein the control logic is operative to:
disable wireless network scanning in response to the pico cell protect message.

5. The wireless mobile station of claim 2, wherein the control logic is operative to:
scan for a wireless network in response to the pico cell protect message, and if a wireless network is found, camp on the wireless network without registering; and
periodically generate a user notification to restart the wireless mobile station in response to the pico cell protect message until the wireless mobile station is restarted.

6. The wireless mobile station of claim 2, wherein the control logic is operative to:
disable at least one of the wireless mobile station and a wireless in-vehicle CDMA pico cell transmitter of the transceiver and after a specified period, re-enable the at least in-vehicle CDMA pico cell transmitter and search for a CDMA pico cell channel from a non-invehicle CDMA pico cell; and if no non-in-vehicle CDMA pico cell channel is found, restart the wireless mobile station and begin searching for wireless wide area network channels.

7. The wireless mobile station of claim 1, wherein the control logic is to:
   determine that a pico cell is in a beacon mode, where the system identification information includes at least a first network identification data, and
   shut down a CDMA pico transmitter in response to a received CDMA pico cell protect message that instructs the wireless mobile station not to transmit; and
   wherein the control logic further is to:
   determine that the CDMA pico cell is in an in-use mode based on different and second received network identification data from the CDMA pico cell, and
   turn on the CDMA pico cell transmitter in response thereto.

8. A method, comprising:
   locating an in-vehicle wireless CDMA pico cell based on a stored preferred roaming list that comprises at least first area identification data corresponding to an area serviced by at least one wireless wide area network and an area serviced by at least one in-vehicle wireless CDMA pico cell, wherein the first area identification data is associated with a data pair associated with the in-vehicle wireless CDMA pico cell, the data pair including in-vehicle wireless CDMA pico cell system identification data and network identification data; and
   giving priority to the in-vehicle wireless CDMA pico cell over the wireless wide area network identified by the first area identification data, based on the stored preferred roaming list;
   determining a suitable pico channel based on a received pico cell neighbor list and channel list that identifies only the in-vehicle CDMA pico cell;
   receiving a service interruption notification that includes information as to when the CDMA pico service will be unavailable; and receive a CDMA pico cell protect message that instructs not to transmit.

9. The method of claim 8, comprising:
   periodically generating a user notification to restart the wireless mobile station in response to the CDMA pico cell protect message until the wireless mobile station is restarted.

10. The method of claim 8, comprising:
    disabling wireless network scanning in response to the CDMA pico cell device protect message.

11. The method of claim 8, comprising:
    scanning for a wireless network in response to the CDMA pico cell protect message, and if a wireless network is found, camping on the wireless network without registering; and
    periodically generating a user notification to restart the wireless mobile station in response to the CDMA pico cell protect message until the wireless mobile station is restarted.

12. The method of claim 8, comprising:
    shutting down at least one transmitter of the mobile station and disabling a wireless in-vehicle CDMA pico cell transmitter of the associated transceiver; and
    after a specified period of time, re-enabling the at least in-vehicle CDMA pico cell transmitter and searching for a CDMA pico cell channel from a non-invehicle CDMA pico cell; and
    if no non-in-vehicle CDMA pico cell channel is found, restarting the wireless mobile station and begin searching for wireless wide area network channels.

13. The method of claim 8, comprising:
    determining that a CDMA pico cell is in a beacon mode based on first network identification data;
    shutting down a CDMA pico transmitter in response to a received CDMA pico cell device protect message that instructs the wireless mobile station not to transmit;
    determining that the CDMA pico cell is in an in-use mode based on second and different received network identification data from the CDMA pico cell; and
    turning on the CDMA pico cell transmitter in response to the determining that the CDMA pico cell is in an in-use mode.

* * * * *